(12) United States Patent
Cheng et al.

(10) Patent No.: US 8,412,885 B2
(45) Date of Patent: Apr. 2, 2013

(54) SEARCHING A SHARED CACHE BY USING SEARCH HINTS AND MASKED WAYS

(75) Inventors: Liqun Cheng, Hillsboro, CA (US); Zhen Fang, Portland, CA (US); Jeffrey Wilder, Olympia, WA (US); Sadagopan Srinivasan, Hillsboro, OR (US); Ravishankar Iyer, Portland, CA (US); Donald Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 12/590,651

(22) Filed: Nov. 12, 2009

(65) Prior Publication Data

US 2011/0113198 A1    May 12, 2011

(51) Int. Cl.
*G06F 12/00* (2006.01)

(52) U.S. Cl. .......................... 711/128; 711/156; 711/158

(58) Field of Classification Search .................. 711/128, 711/156, 158
See application file for complete search history.

(56) References Cited

U.S. PATENT DOCUMENTS

| | | | |
|---|---|---|---|
| 6,513,104 B1 * | 1/2003 | Gaskins ........................ | 711/169 |
| 6,516,387 B1 * | 2/2003 | Auracher ...................... | 711/123 |
| 6,553,473 B1 * | 4/2003 | Gaskins et al. ............... | 711/169 |
| 2007/0101064 A1 * | 5/2007 | Piry et al. ...................... | 711/128 |
| 2010/0250856 A1 * | 9/2010 | Owen et al. .................... | 711/128 |

* cited by examiner

*Primary Examiner* — Stephen Elmore
(74) *Attorney, Agent, or Firm* — Trop, Pruner & Hu, P.C.

(57) ABSTRACT

In an embodiment of the present invention a method includes: sending request for data to a memory controller; arranging the request for data by order of importance or priority; identifying a source of the request for data; and if the source is an input/output device, masking off P ways in a cache; and allocating ways in filling the cache. Other embodiments are described and claimed.

15 Claims, 3 Drawing Sheets

SEARCHING A SHARED CACHE BY USING SEARCH HINTS AND MASKED WAYS

BACKGROUND OF THE INVENTION

1. Field of the Invention

The present invention relates to a field of processor design, and, more specifically, to an apparatus for and a method of sharing cache resources between different engines.

2. Discussion of Related Art

Computing power of processors is increasing much faster than bandwidth available from main memory. As a result, increasingly large and complex caches need to be designed to support and feed compute-intensive engines in the processors.

However, allocating more transistors to cache results in the cache occupying a larger portion of die area. Furthermore, available cache resources, no matter how large, become increasingly difficult to allocate.

In particular, partitioning of the cache resources among various compute engines to obtain optimal performance for different workloads becomes very difficult to achieve effectively and efficiently.

DETAILED DESCRIPTION OF THE PRESENT INVENTION

In the following description, numerous details, examples, and embodiments are set forth to provide a thorough understanding of the present invention. However, it will become clear and apparent to one of ordinary skill in the art that the invention is not limited to the details, examples, and embodiments set forth and that the invention may be practiced without some of the particular details, examples, and embodiments that are described. In other instances, one of ordinary skill in the art will further realize that certain details, examples, and embodiments that may be well-known have not been specifically described so as to avoid obscuring the present invention.

Figure 1:
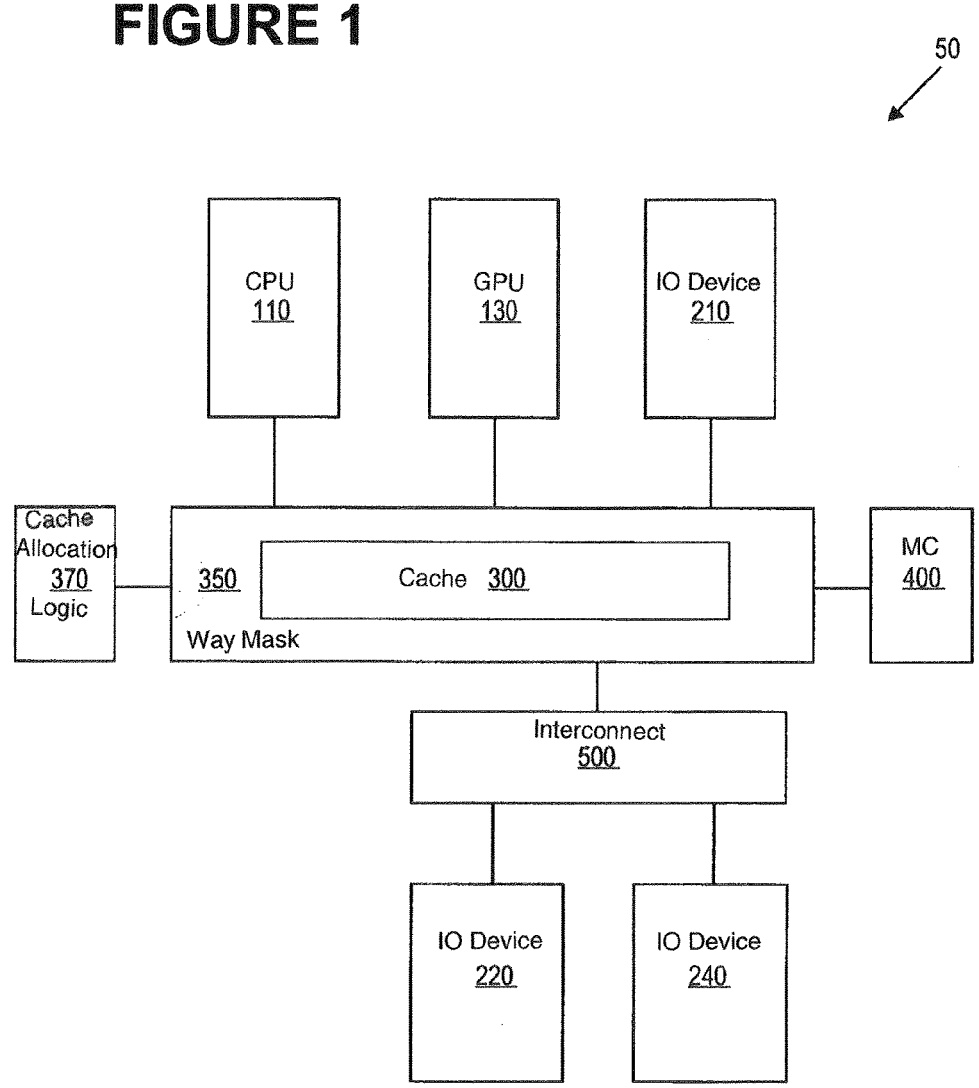
FIG. 1 shows a cache shared by compute-engine devices and input/output devices according to an embodiment of the present invention.

As shown in an embodiment of the present invention in FIG. 1, the present invention envisions an apparatus for and a method of sharing a cache 300 among devices on a die 50. For a given workload, optimized sharing of the cache 300 among the devices on the die 50 increases overall performance of the die 50. Thus, the present invention reduces cache thrashing and lowers power consumption.

The die 50 may include a level 1 (L1) cache and a level 2 (L2) cache. In certain cases, a level 3 (L3) cache is also included. A last level cache (LLC) is a cache 300 that is located farthest from a compute engine device and nearest to main memory. The cache 300 on-die may include memory devices that have lower density and lower capacity but higher speed, such as static random access memory (SRAM). The main memory off-die may include other memory devices that have lower speed but higher density and higher capacity, such as dynamic random access memory (DRAM).

The devices may include compute-engine devices as well as input/output (IO) devices that are integrated on the die. The compute-engine devices may include a central processing unit (CPU) 110, a graphics processing unit (GPU) 130, and a core (not shown) in a multi-core die.

The IO devices integrated on the die may include on-die accelerators, such as for graphics (gfx), communications, video, speech recognition, and encryption. Some IO devices 210 are connected directly to the cache 300. Other IO devices 220, 240 are connected through an IO interconnect 500 to the cache 300. The IO interconnect 500 may include Peripheral Component Interconnect Express (PCIe) and Intel On-chip Scaleable System Fabric (IOSF) functionality.

A memory controller 400 manages transfer of data between the devices and the cache 300. The memory controller 400 is also integrated on the die 50. The compute-engine devices 110, 130, and the IO devices 210, 220, and 240, send requests for data to the memory controller 400. The memory controller 400 arranges the data requests by order of importance or priority and determines how the cache 300 is to be shared. The memory controller 400 may be programmable, such as through a driver.

In an embodiment of the present invention, a distributed memory interface (not shown) reduces congestion and increases bandwidth while lowering frequencies. In an embodiment of the present invention, the distributed memory interface includes a ring bus (not shown) with ring stops located at four corners. The distributed memory interface allows use of a high-speed cache 300.

In one case, data may be written to a multiplexer and through an arbiter to a nearest ring stop. The ring bus may be bi-directional with two bus lines running in opposite directions. The bus lines have a certain bus width.

The data may be directed along the bus line to another ring stop. Then, the data may be written from the ring stop to another arbiter and through a sequencer along a memory channel to the cache 300.

In another case, the data may be read from the cache 300 and sent through another memory channel through the sequencer and then the arbiter to the ring stop. The data may be sent along a bus line to another ring stop. Then, the data may be read from the ring stop through an arbiter and then a crossbar.

FIG. 1 shows an 8-way set-associative cache 300 on a die 50. A physical address of the cache includes a tag and an index. The tag represents physical tag, line state, and error correction code (ECC). Power consumption of the cache 300 may be divided into four categories: tag sub-bank leakage, tag dynamic, data sub-bank leakage, and data dynamic.

Reading the tags for all the ways in a selected set and comparing them against an incoming memory request tag results in tag dynamic power consumption. A sleep transistor (not shown) may be used to reduce data sub-bank leakage power consumption. However, the sleep transistor needs at least a full clock cycle in the cache to pull up a Vcc (positive supply voltage) in the LLC. All the sub-banks are woken up in parallel with tag comparison to avoid a performance penalty to a cache read hit, but then savings to the data sub-bank leakage power consumption are reduced.

Figure 2:
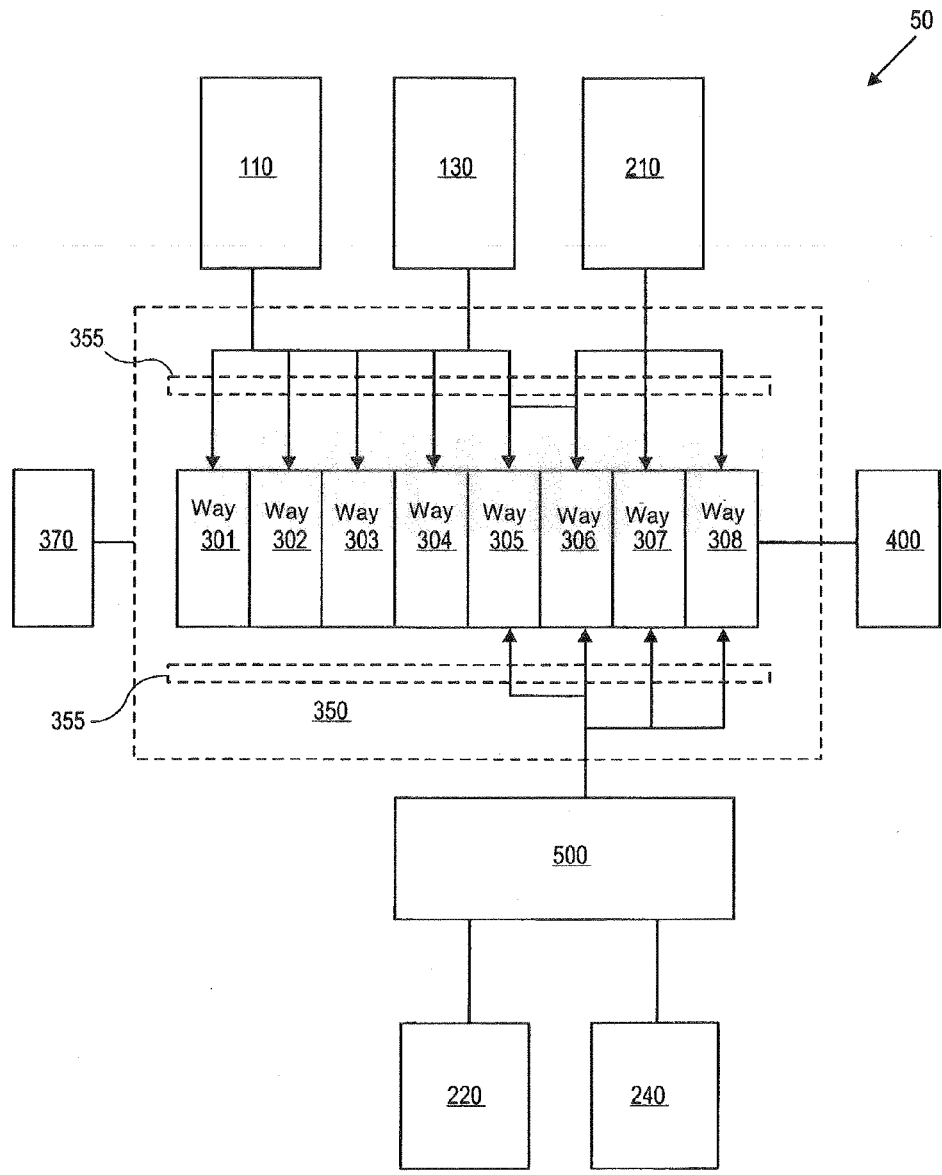
FIG. 2 shows a bit mask controlling ways in a cache according to an embodiment of the present invention.

The data array of the set-associative cache 300 on the die 50 may be organized into ways as shown in an embodiment of the present invention in FIG. 2. For example, the 8-way set-associative cache 300 is partitioned into ways 301, 302, . . . , 307, 308 by a way mask 350. The way mask 350 may be included in cache allocation logic 370.

The cache allocation logic 370 evaluates the memory requests from the various devices, such as 210, and determines which ways, such as 305, in the cache 300 to access for each of the devices.

Each way in the cache 300 may include a number of subarrays. If desired by circuit implementation, the way mask 350 allows all of the sub-arrays in a particular way to be enabled or disabled together. Selective ways does not alter set mapping of cache blocks and so avoids a need for flushing blocks in the enabled sub-arrays upon resizing.

The size of the cache 300 allocated to a device may be changed linearly by using selective ways. For smaller cache sizes, set associativity can significantly impact cache performance. However, for larger cache sizes, capacity plays a more important role than set associativity.

Power savings are optimized by choosing a size for the cache 300 that is closest to a size demanded by an application. Optimizing the size of the cache 300 will also reduce sub-threshold leakage energy dissipation which is proportional to size of the cache 300 in CMOS circuits.

Compared with selective sets, selective ways is relatively simple to design since only a way mask 350 and corresponding cache allocation logic 370 need to be specified.

The present invention envisions selective searching in the shared cache 300 in response to requests for data initiated by IO devices, such as 210, integrated on the die 50. Selective allocation is controlled by the way mask 350 and cache allocation logic 370, as shown in FIG. 2.

The allocation of cache resources need not be complete. A way in the cache 300 can be turned off (such that no device can use it) such as to reduce power consumption. In such a situation, some ways in the cache 300 are not used.

The allocation of cache resources need not be symmetrical. Allocation of a way in the cache 300 can be exclusive (such that only one device can use the way) or non-exclusive (such that multiple devices can share the way).

A compute-engine device initiated refill of the cache may be allocated to most of the ways in the cache. However, an IO-device initiated refill of the cache may only be allocated to a small number of the ways in the cache. For example, in the 8-way allocation mask 350, 4 ways may be allocated to the compute-engine devices (P) only, 2 ways may be allocated to the IO devices (I) only, and 2 ways may be allocated to both (B).

The way mask 350 applies to cache fills, but not to cache lookups. When allocation changes and a device no longer has access to certain ways, data may no longer be allocated in those ways, but any existing data in those ways may still be looked up. More importantly, the compute-engine devices and the IO devices can share a same address space. Therefore, even without any allocation change, an IO device initiated memory request still causes a search of all the ways because the same memory block could have been cached because of a compute-engine device initialized request. Thus, cacheable requests issued by both the compute-engine devices and the IO devices still cause a search of all the ways in the cache 300 because a memory block could reside anywhere in a set.

According to the present invention, a microarchitectural change is made by using cache allocation logic 370 to control the tag comparison operation. Since a memory block that is only referenced by the IO devices will never reside in any of the P ways, a bit mask 355 will mask off the P ways for an IO-initiated memory request. Software is used to configure the bit mask 355 to control the ways which may be allocated for an IO device initiated memory load.

Further according to the present invention, a software-visible architectural feature is added. The present invention envisions two possible implementations.

In a first method, an extra bit is used in commands to provide a hint from the IO devices that the rest of the ways will not have the data. Alternatively, an existing bit may be re-used to provide the hint if allowed by protocol.

In a second method, a surplus physical address bit is used to signal the selective search hint. A highest bit of the physical address is usually always 0 since the maximum allowed physical address range is typically an order of magnitude larger than the actually installed DRAM. Upon seeing the selective search hint from the IO device, the IO interconnect 500 flips the most significant bit (MSB) of the physical address before the request is forwarded to the system coherent interconnect. The IO interconnect 500 specification to standardize interfaces to connect intellectual property (IP) blocks is usually PCIe/IOSF. Thus, the cache controller 400, seeing that the MSB equals 1, will only search the I ways and the B ways instead of all the ways in the cache 300.

The present invention can significantly reduce power consumption of a shared cache 300 by enabling more effective use of existing circuit-level techniques. First, unnecessary tag comparisons are eliminated. Depending on whether the read hit pipeline timing allows gating of the P ways, the present invention helps to eliminate part or all of the P way tag array dynamic power. Second, leakage power savings can be maximized by not pulling up the Vcc of the P way data sub-banks.

The present invention helps to eliminate unnecessary cache probes for IO-initiated memory requests. A similar approach may be used in the other direction to allow compute-engine device initiated memory requests to not search the cache blocks that hold data used only by IO devices.

Figure 3:
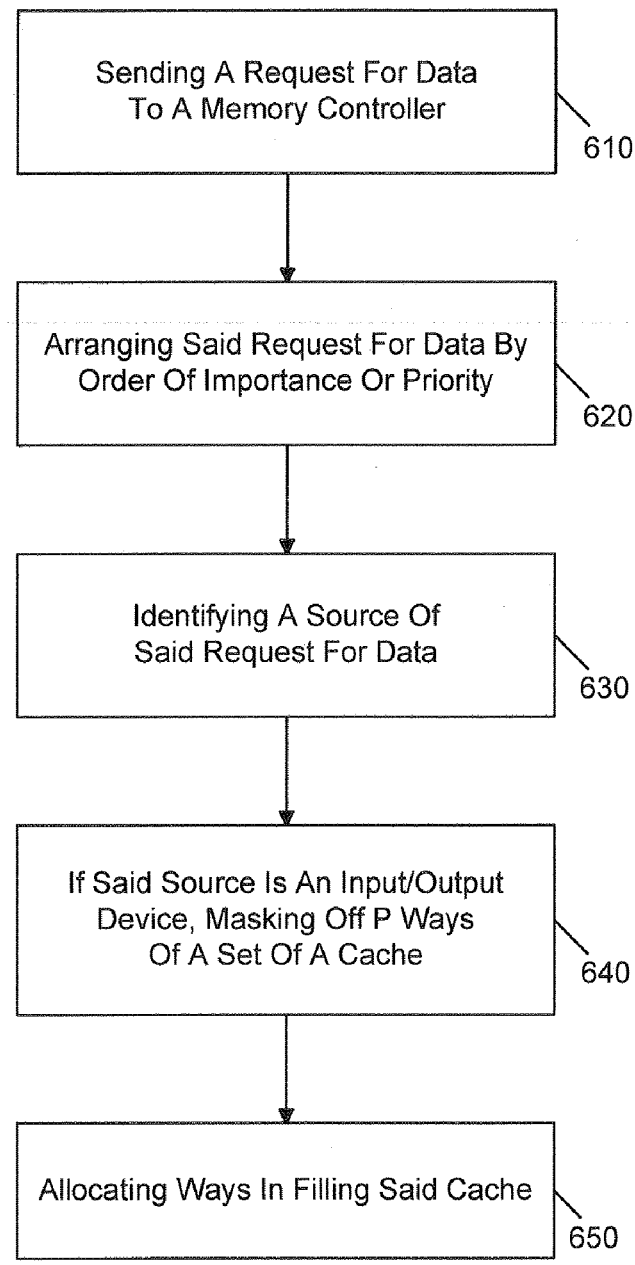
FIG. 3 is a flow diagram of a method in accordance with an embodiment of the present invention.

FIG. 3 is a flow diagram of a method. In one embodiment, a method includes: sending a request for data to a memory controller (block 610); arranging said request for data by order of importance or priority (block 620); identifying a source of said request for data (block 630); if said source is an input/output (IO) device, masking off P ways in a cache (block 640); and allocating ways in filling said cache (block 650).

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

We claim:

1. A method comprising:
    sending a request for data to a memory controller of a die from a source of said die;
    arranging, by said memory controller, said request for data by order of importance or priority;
    identifying, in a cache allocation logic of said die, said source of said request for data;
    if said source is an input/output (IO) device, masking off P ways of a set of a cache, where P is a number of ways in said set allocated to compute-engine devices; and
    allocating ways in filling said cache.

2. The method of claim 1 further comprising: if said source is a compute-engine device, masking off I ways in said cache, where I is a number of ways in said set allocated to IO devices.

3. The method of claim 2 wherein said masking off is performed by a bit mask.

4. The method of claim 1 wherein said cache is a last level cache (LLC).

5. The method of claim 1, further comprising turning off a way of said cache to reduce power consumption.

6. An apparatus comprising:
a cache on a die;
a compute-engine device connected to said cache;
a first input/output (IO) device connected to said cache;
an IO interconnect connected to said cache;
a second IO device connected to said IO interconnect; and
cache allocation logic to control ways in said cache according to a way mask to allocate a first number of ways with said compute-engine device and a second number of ways with said first IO device.

7. The apparatus of claim 6 wherein said compute-engine device comprises a central processing unit (CPU).

8. The apparatus of claim 6 wherein said compute-engine device comprises a graphics processing unit (GPU).

9. The apparatus of claim 6 wherein said first IO device comprises an on-die accelerator.

10. The apparatus of claim 6 wherein said second IO device comprises an on-die accelerator.

11. The apparatus of claim 6 wherein said IO interconnect comprises Peripheral Component Interconnect Express (PCIe) functionality.

12. The apparatus of claim 6 wherein said IO interconnect comprises Intel On-chip Scaleable System Fabric (IOSF) functionality.

13. An apparatus comprising:
a multi-core die including:
at least one central processing unit (CPU)
at least one graphics processing unit (GPU);
a first input/output (IO) device;
a last level cache (LLC), wherein said at least one CPU and said at least one GPU are coupled to said LLC and said first IO device is coupled to said LLC via an interconnect; and
cache allocation logic to control ways in said LLC according to a way mask to allocate a first number of ways with said at least one CPU and a second number of ways with said first IO device.

14. The apparatus of claim 13, wherein said cache allocation logic is to identify a source of a request for data, and if said source is said first IO device mask off P ways of a set of said LLC, where P is a number of ways in said set allocated to said at least one CPU.

15. The apparatus of claim 14, wherein if said source is said at least one CPU, said cache allocation logic is to mask off I ways of said set of said LLC, where I is a number of ways in said set allocated to said first IO device.

* * * * *